(12) United States Patent
Chiu

(10) Patent No.: US 6,354,552 B1
(45) Date of Patent: Mar. 12, 2002

(54) TILT ANGLE ADJUSTABLE STAND FOR LCD DISPLAY

(75) Inventor: Hui-Min Chiu, Taipei Hsien (TW)

(73) Assignee: Posiflex Business Machines, Inc., Union City, CA (US)

( * ) Notice: Subject to any disclaimer, the term of this patent is extended or adjusted under 35 U.S.C. 154(b) by 0 days.

(21) Appl. No.: 09/433,698

(22) Filed: Nov. 3, 1999

(30) Foreign Application Priority Data

Mar. 18, 1999 (TW) .......................................... 088204142

(51) Int. Cl.[7] .............................................. F16M 13/00
(52) U.S. Cl. ........................................ 248/422; 248/918
(58) Field of Search .................................. 248/921, 922, 248/923, 371, 918, 157, 422, 423; 108/6, 7

(56) References Cited

U.S. PATENT DOCUMENTS

| | | | | |
|---|---|---|---|---|
| 2,030,348 A | * | 2/1936 | Barrett | 108/6 |
| 3,550,891 A | * | 12/1970 | Scott | 108/6 X |
| 4,693,444 A | * | 9/1987 | Williams et al. | 108/7 X |
| 5,088,676 A | * | 2/1992 | Orchard et al. | 248/922 X |

\* cited by examiner

Primary Examiner—Ramon O. Ramirez
Assistant Examiner—Korie H. Chan
(74) Attorney, Agent, or Firm—Pacific Law Group LLP; Chi Ping Chang

(57) ABSTRACT

This invention relates to a tilt angle stand suitable for flat panel display for view angle adjustment. The tilt angle stand comprises a holding plate to which the flat panel display is installed. The holding plate comprises a pair of gear plates, each of the gear plates having a plurality of arc shape gear teeth and a shaft through which each of the gear plates becomes connected to a sidewall of the base plate to enable the holding plate to move freely. The tilt angle stand further comprises a pair of positioning pawls comprising several gear teeth matchably engaged with the corresponding arc shape gear teeth of the gear plates. A pair of cams rotationally installed inside a pair of grooves of the corresponding positioning pawls by a transmission shaft, which further connects said pair of cams to the corresponding sidewalls of the base plate to effectuate simultaneous rotational movements of said pair of cams so that the gear teeth of the positioning pawls becomes tightly engaged with the correspondent arc shape gear teeth of the gear plate so as to lock the gear plate in a still position thereby securing a desirable view angle for the flat panel display.

5 Claims, 5 Drawing Sheets

US 6,354,552 B1

TILT ANGLE ADJUSTABLE STAND FOR LCD DISPLAY

FIELD OF INVENTION

The present invention relates generally to a tilt angle adjustable stand, in particularly, relates to a tilt angle adjustable stand for flat panel display such as LCD display, monitor and related products.

BACKGROUND OF THE INVENTION

Flat panel display such as LCD monitor and plasma screen display has gained increasing popularity over the traditional display as the former is less bulky and easier to be carried for mobile use. While the flat panel display demonstrates such advantages over the traditional display, it nevertheless has its own limitations. One notable limitation is that the light intensity of the flat panel display, which affects the clarity of the visual objects displayed, may vary significantly when these visual objects are viewed from different angles. Consequently, unless the view angle of the flat panel display can be easily adjusted through the use of a tilt angle stand, its popularity may face challenge.

As shown in FIG. 1, the prior art stand for the flat panel display comprises a shaft cover 20 that transversely protrudes from a backside of a LCD monitor 10. The shaft cover 20 is connected with a shaft 30, which penetrates through a pair of shaft holes of a base plate 40 to become engaged with a pair of rotation knob 50. The rotation knob 50 is rotated clockwise to tighten up and fix the LCD monitor 10 to the base plate 40 of the stand. When the view angle of the LCD monitor needs to be adjusted, the LCD monitor 10 has to be un-tighten by rotating the rotation knob 50 counterclockwise while pushing simultaneously the LCD monitor 10 to a desirable angle, followed by re-tightening up the LCD monitor 10 to the base plate 40 through the action of the rotation knob 50.

The prior art LCD monitor stand therefore has a significant shortcoming. As it relies solely on the action of the rotation knob 50 to tighten up the LCD monitor 10 to the base plate 40, the LCD monitor may easily be loosen up regardless how hard the rotation knob 50 is tightened. In addition, such prior art stand is not capable of providing steady support for LCD monitor whose screen is designed as a "touch input device" to sustain pressure resulting from constant touching and pushing by users.

There is therefore an apparent need for a flat panel display stand that not only provides firm support for the monitor, but also provides a convenient mechanism for the adjustment of view angle.

Accordingly, it is an object of this invention to provide a tilt angle stand for flat panel display that employs a cam to tighten up the monitor to the stand while providing a convenient mechanism for view angle adjustment.

SUMMARY OF THE INVENTION

The present invention represents advancement in the art in that it produces a tilt angle, adjustable stand suitable for adjusting the view angles for flat panel display such as LCD display, monitor and related products, which substantially obviates the problems of prior art stand. A tilt angle stand for flat panel display, comprising:

One aspect of the invention is to provide for a holding plate to which the flat panel display is installed onto the tilt angle stand. The holding plate comprises a pair of gear plates protruding from left and right undersides of the holding plate, Each of the gear plates has a plurality of arc shape gear teeth and a shaft through which each of the gear plates becomes connected to a sidewall of a base plate that enables the holding plate to move around the shaft towards or away from the base plate to provide for easy adjustment of the view angle of the flat panel display.

One more aspect of the invention is to provide for a pair of positioning pawls pivotally installed to the correspondent left and right sidewall of the base plate. Each of the positioning pawls has several gear teeth that match the corresponding arc shape gear teeth of the gear plates such that the positioning pawls are firmly engaged with the gear plate when the gear plate is being rotated for angle adjustments.

Another aspect of the invention is to provide for a pair of cams rotationally installed inside a pair of grooves of the corresponding positioning pawls through a transmission shaft. The transmission shaft connects the pair of cams to the corresponding sidewalls of the base plate to effectuate simultaneous rotational movements of the pair of cams in response to the rotation of the transmission shaft so that the gear teeth of the positioning pawls becomes tightly engaged with the correspondent arc shape gear teeth of the gear plate to lock the gear plate in a still position thereby securing a desirable view angle for the flat panel display.

DETAILED DESCRIPTION OF THE INVENTION

Figure 1:
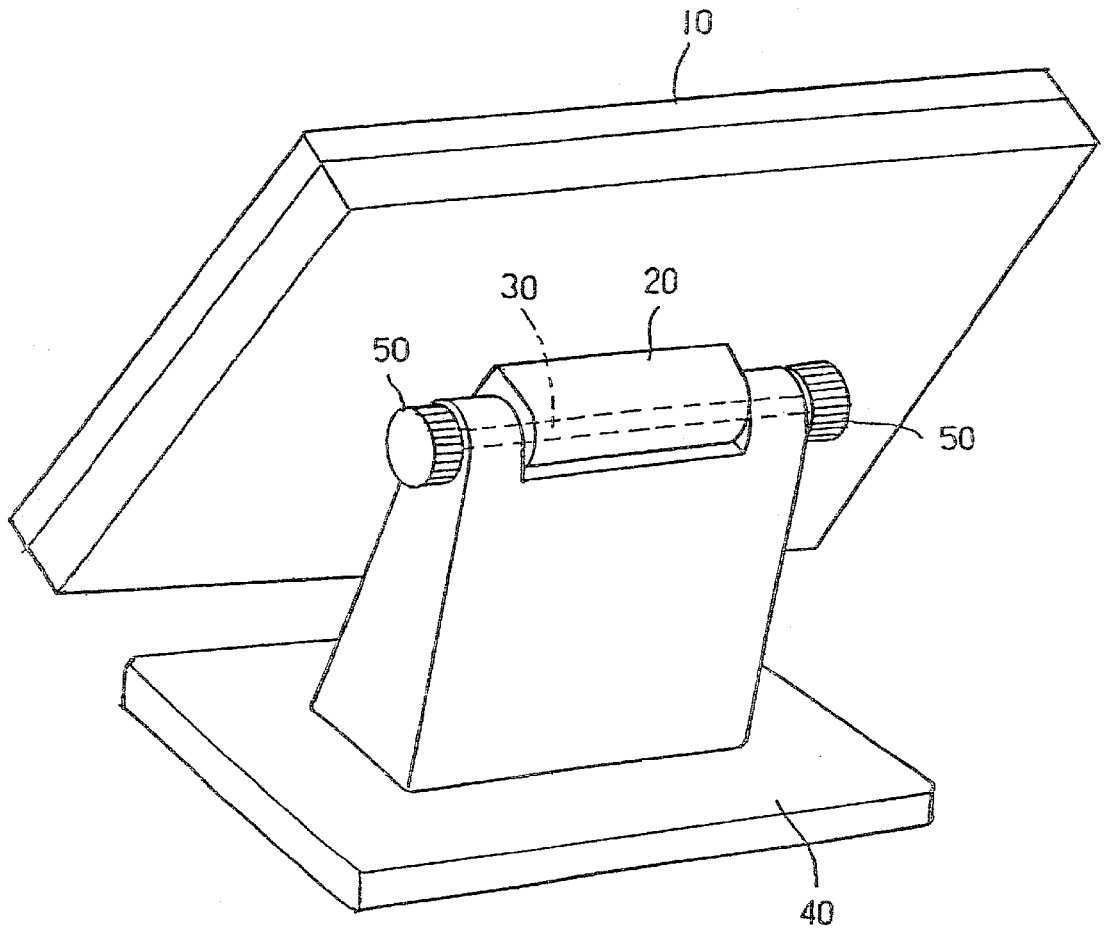
FIG. 1 illustrates a prior art stand for LCD monitor.
Figure 2:
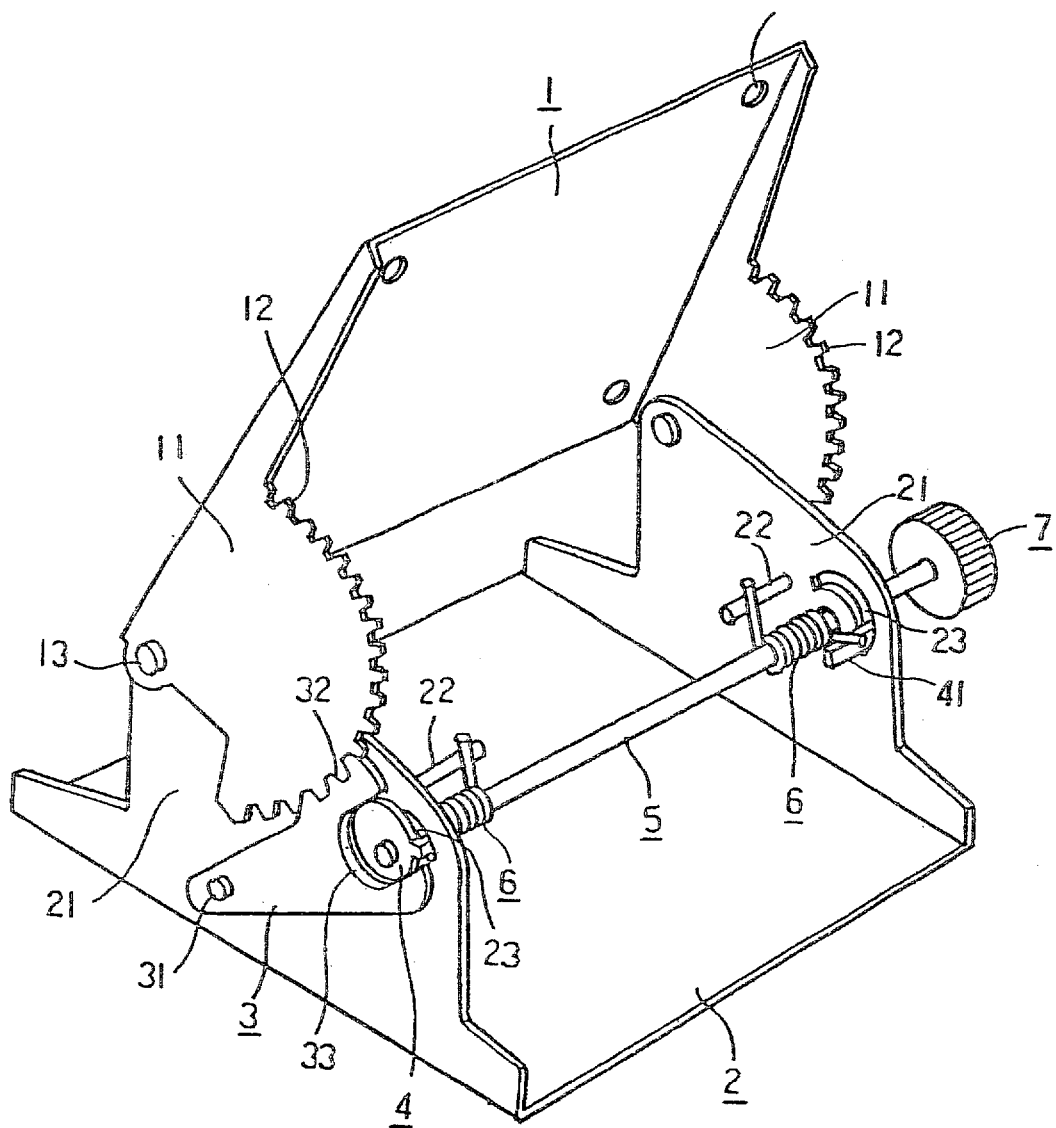
FIG. 2 shows a tilt angle LCD monitor stand according to the present invention.

Referring to FIG. 2, there is shown a tilt angle stand for LCD monitor according to the invention. The stand comprises a holding plate 1 to which the LCD monitor is installed and being fixed onto the stand. The holding plate 1 has a pair of arc shape gear plates 11 protruding from the left and right undersides of the plate 1 to provide angle adjustment for the LCD monitor. Each of the arc shape gear plates 11 has a plurality of gear teeth 12 and a shaft 13, the latter corresponds to a shaft hole located on the gear plates 11 through which the shaft 13 becomes engaged with and connected to a sidewall 21 of the base plate 2. As a result, the holding plate 1 is adjustably engaged with the base plate 2, enabling the holding plate 1 to move around the shaft 13 towards or away from the base plate 2 to provide for angle adjustment.

The base plate 2 further comprises a pair of positioning pawls 3 pivotally installed or mounted to the correspondent left or right sidewall 21 of the base plate 2. Each of the positioning pawls 3 comprises several gear teeth 32 which are matchably insertable into and thereby firmly engaged with the correspondent arc shape gear teeth 12 in such a manner that an approximately 90° angle is formed by and between the relative positions of the shaft 13, the gear teeth 32 and the shaft 31 of the positioning pawls 3 to ensure that the positioning pawls 3 is well positioned to provide sufficient counter-strength to support the gear plate 11 when the gear plate 11 is being rotated for angle adjustment.

Referring again to FIG. 2, the aforementioned counter-strength provided by the positioning pawls 3 can be further stabilized by joint action of a pair of cams 4 and a pair of torsion springs 6 as illustrated hereunder. Each of the cams 4 is rotationally installed inside a groove 33 of the positioning pawls 3 through a shaft connected to the correspondent sidewall 21. When the cam 4 rotates, it forces the positioning pawls 3 to move coordinately in an up and down fashion so that the gear teeth 32 of the positioning pawls 3 become tightly engaged with the correspondent arc shape gear teeth 12 of the gear plate 11 until the cam 4 rotates to its dead point at which point the cam 4 will cease rotating so as to lock the gear plate 11 in a still position thereby securing a desirable view angle for the LCD monitor. To further lock and secure the view angle provided by gear plate 11, the pair of torsion springs 6 are provided to a transmission shaft 5 of the cam 4 such that, for each of the torsion springs 6, one end of the torsion spring 6 is placed against a first spring stopper 22 of the sidewall 21 while the other end of the torsion springs 6 is placed against a second spring stopper 41 so that the cam 4 will cause the gear plate 11 remaining firmly in a lock position in the absence of an externally applied force. When activated by an externally applied force, the cam 4 will cause the gear teeth 32 of the positioning pawls 3 disengaged from the gear plate 11 to permit the gear plate 11 being rotated freely in an manner towards or away from the base plate 2 to achieve desirable view angles and, upon withdrawal of the externally applied force, the cam 4 will immediately go back to its dead point by torsion spring to cause the positioning pawls 3 to lock up the gear plate 11 in a still position. As a result, the LCD monitor is adjustably fixed onto the tilt angle stand of the present invention and its view angle can be readily adjusted through the dilated movements of the gear plate without the need or action of rotation knobs.

Referring still to FIG. 2, it is further illustrated that the pair of cams 4 is connected to each other by the transmission shaft 5 to provide simultaneous cam rotation jointly with the movement of the respective positioning pawls 3. For a practical purpose, one end of the transmission shaft 5 may be connected to a release knob 7 positioned outside the sidewall. 21. The release knob 7 can be rotated to provide easy release of the cam 4 and gear plate 11 from their lock positions. For each of the sidewall 21, there may further contain a sectional slot 23 in close contact with the transmission shaft 5 wherein the sectional slot 23 acts jointly with the spring stopper 41 to define the rotation dead point for the cam 4 and the rotation angle for the release knob 7.

Figure 3:
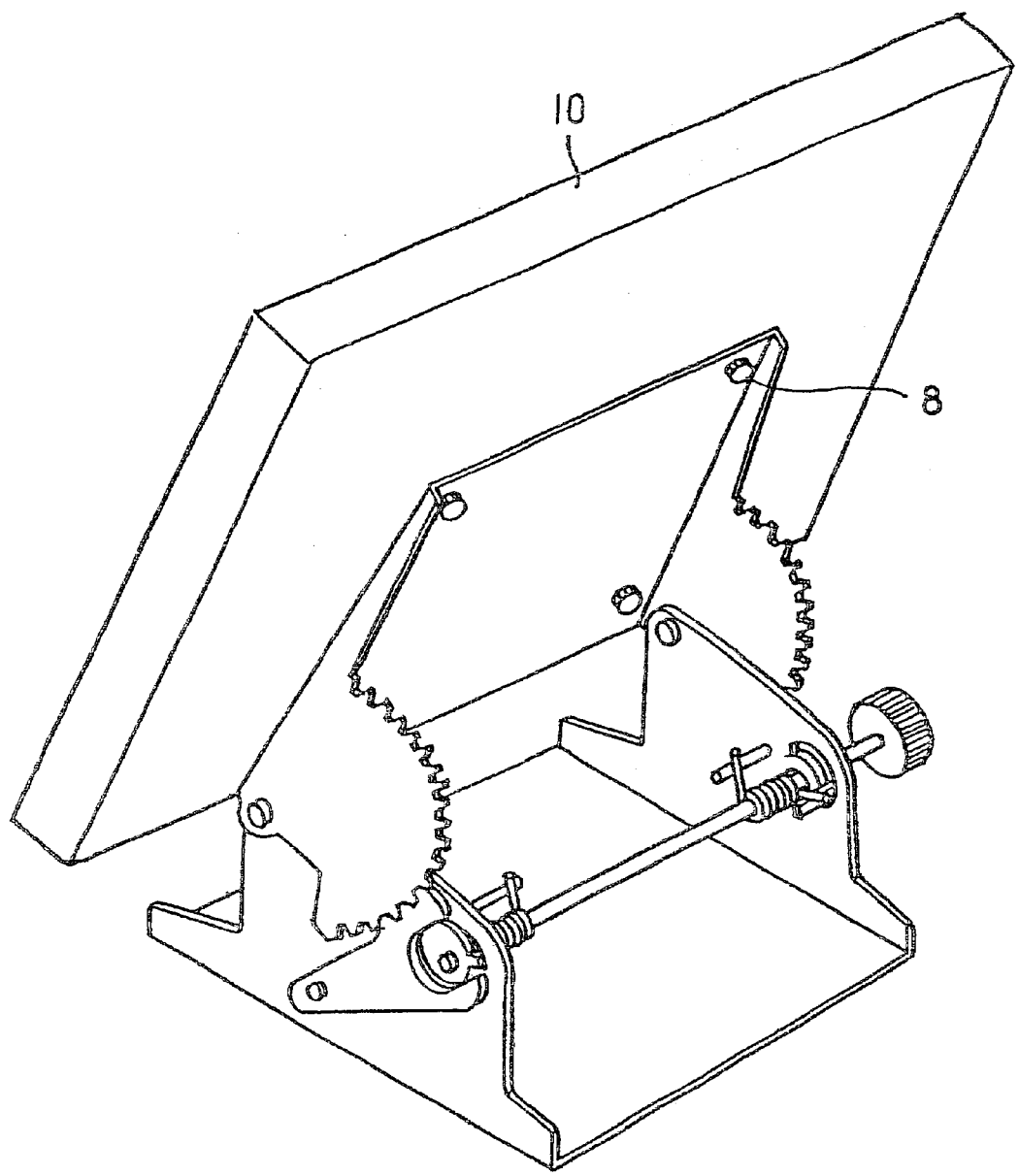
FIG. 3 illustrates the firmly engagement of the gear plate and the positioning pawl after the LCD monitor is mounted onto the tilt angle stand.

Referring to FIG. 3, there is shown a perspective view of the LCD monitor mounted onto the tilt angle stand according to the invention. A LCD monitor 10 or any other flat panel display terminal is fixedly installed on the holding plate 1 of the stand by a plurality of screws 8. As illustrated further in FIG. 4, when the view angle of the LCD monitor 10 is being adjusted, the release knob 7 is first rotated clockwise to release the positioning pawls 3 from a lock position and to further disengage the positioning pawls 3 from the gear plate 11, which permits an user to adjust the LCD monitor to a desirable view angle simply by pushing the LCD monitor to a desirable position, followed by release the release knob 7 to lock the LCD monitor 10 to the selected position.

Figure 4:
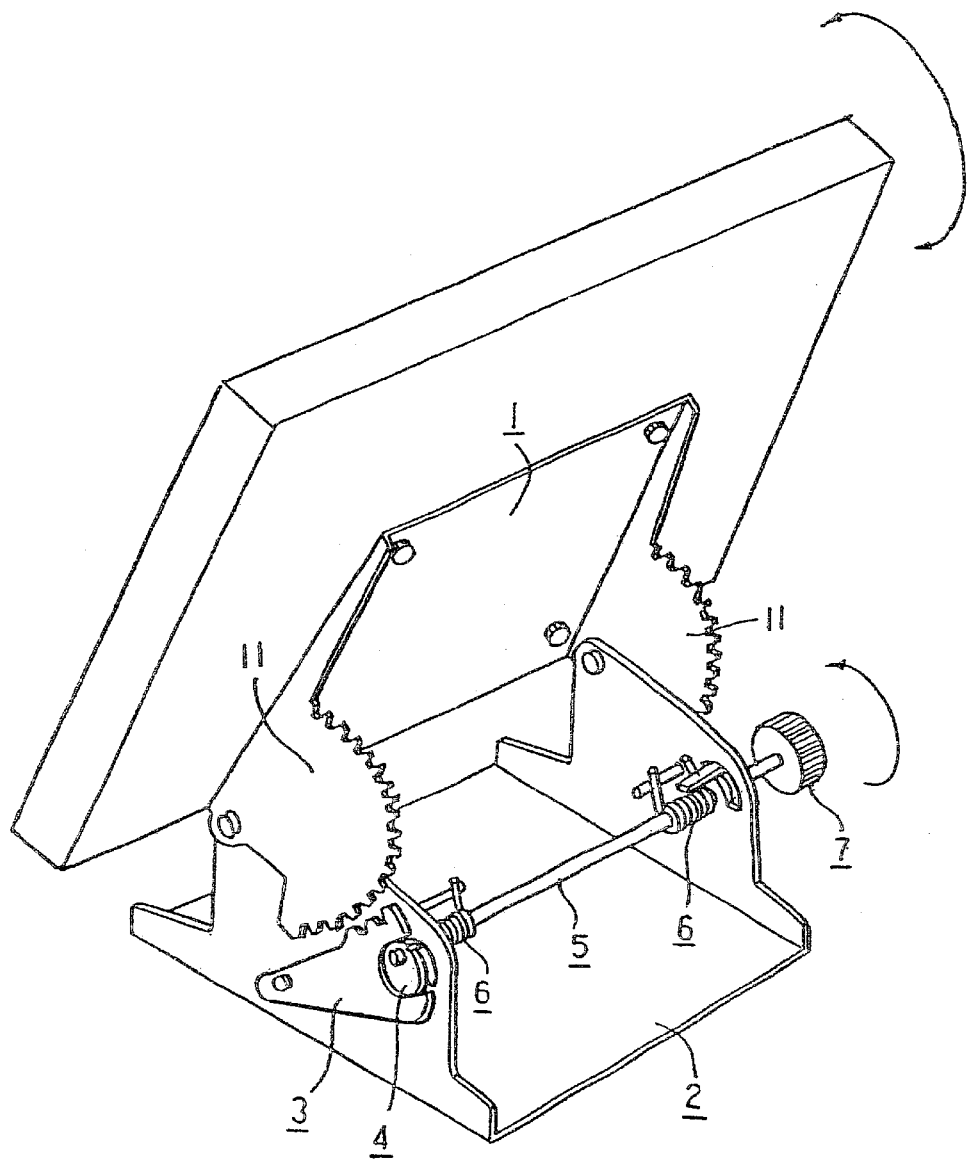
FIG. 4 illustrates the disengagement of the gear plate and the positioning pawl for view angle adjustment.

Referring jointly to FIGS. 2, 3 and 4, it should be understood that the relative spatial positions of the sidewall 21 with respect to the gear plates 11, the positioning pawls 3 and the cams 4 may be varied without substantial deviations from the present invention. For instances, the gear plates 11, the positioning pawls 3 and the cams 4 can be installed on the inside of the sidewall 21 without affecting the function of the tilt angle stand as described above.

Figure 5:
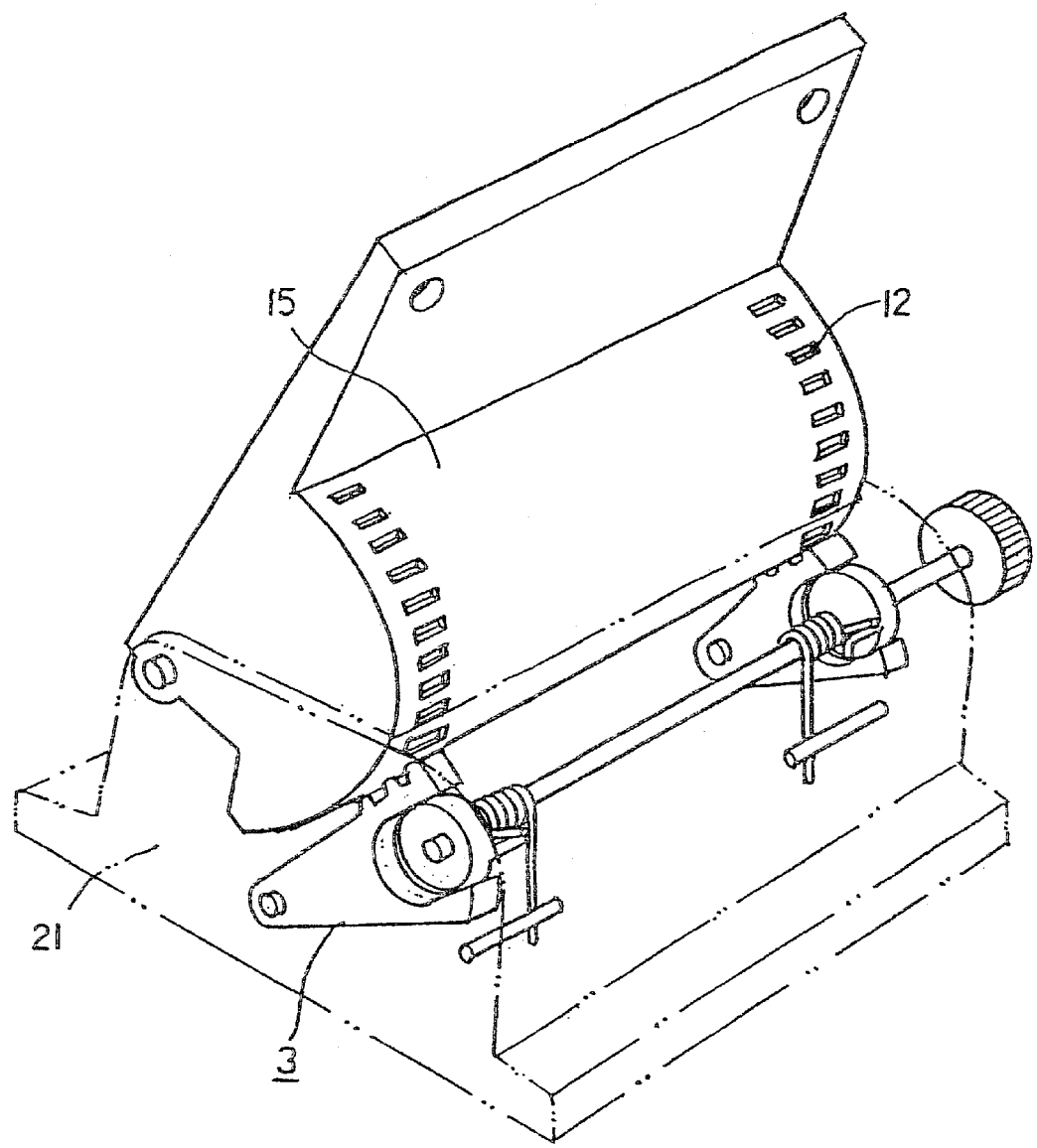
FIG. 5 shows an alternative embodiment of the tilt angle stand according to the invention.

Referring to FIG. 5, an alternative embodiment according to the present invention is illustrated. This embodiment has substantially the same structure as the one described above except that the gear plate 11 is modified from the plate-like structure to a sectional drum transversely located between the sidewall 21 of the base plate 2. The arc shape gear teeth 12 is provided on the arc sharp surface of the sectional drum in a position relative to the corresponding arc teeth of the positioning pawls 3.

Although the preferred embodiment of the invention has been disclosed for illustrative purposes, those skilled in the art will appreciate that various modifications, additions and substitutions are possible, without departing from the scope and spirit of the invention, as disclosed in the accompanying claims.

What is claimed is:

1. A tilt angle stand for flat panel display, comprising:

a holding plate to which the flat panel display is installed onto the tilt angle stand wherein the holding plate comprises a pair of gear plates protruding from left and right undersides of the holding plate, each of the gear plates having a plurality of arc shape gear teeth and a shaft;

a base plate having left and right sidewalls connected to each of the gear plates through the plurality of arc shape gear teeth and the shaft to enable the holding plate to move around the shaft towards or away from the base plate to provide for angle adjustments of the flat panel display;

a pair of positioning pawls pivotally installed to the correspondent left and right sidewall of the base plate, each of the positioning pawls comprising a plurality of gear teeth and a groove, wherein the plurality of gear teeth are matchably engageable with the plurality of arc shape gear teeth of the gear plates to support the gear plates when the gear plates are being moved for angle adjustments;

a transmission shaft to provide connection between the correspondent left and right sidewall of the base plate; and a pair of cams, each is rotationally installed inside the groove of the corresponding positioning pawls to connect with the corresponding sidewalls of the base plate through the transmission shaft to effectuate simultaneous rotational movements of said pair of cams in response to the rotation of the transmission shaft so that the gear teeth of the positioning pawls becomes tightly engaged with the correspondent arc shape gear teeth of the gear plate so as to lock the gear plate in a still position thereby securing a desirable view angle for the flat panel display.

2. The tilt angle stand for flat panel display according to claim 1 further comprises a pair of torsion springs wherein each of said pair of torsion springs is installed separately on one end of the transmission shaft to secure a lock position for the cams.

3. The tilt angle stand for flat panel display according to claim 2 further comprises a pair of spring stoppers installed on each of the sidewalls such that one end of each said torsion springs is placed against a first spring stopper while the other end of each said torsion springs is placed against a second spring stopper to assist the cams to lock the gear plate in a lock position.

4. The tilt angle stand for flat panel display according to claim 3 further comprises a release knob rotationally installed on one end of the transmission shaft outside the sidewall to provide easy release of the cams and gear plate from their lock positions by rotating the release knob.

5. The tilt angle stand for flat panel display according to claim 4 further comprises a pair sectional slots installed on the respective sidewalls in close contact with the transmission shaft wherein the sectional slots act jointly with the spring stoppers to define a rotation dead point for the cam and the rotation angle for the release knob.

* * * * *